July 13, 1943.  A. L. RODGERS  2,324,174
WEIGHT INDICATOR
Filed May 3, 1940   2 Sheets-Sheet 1
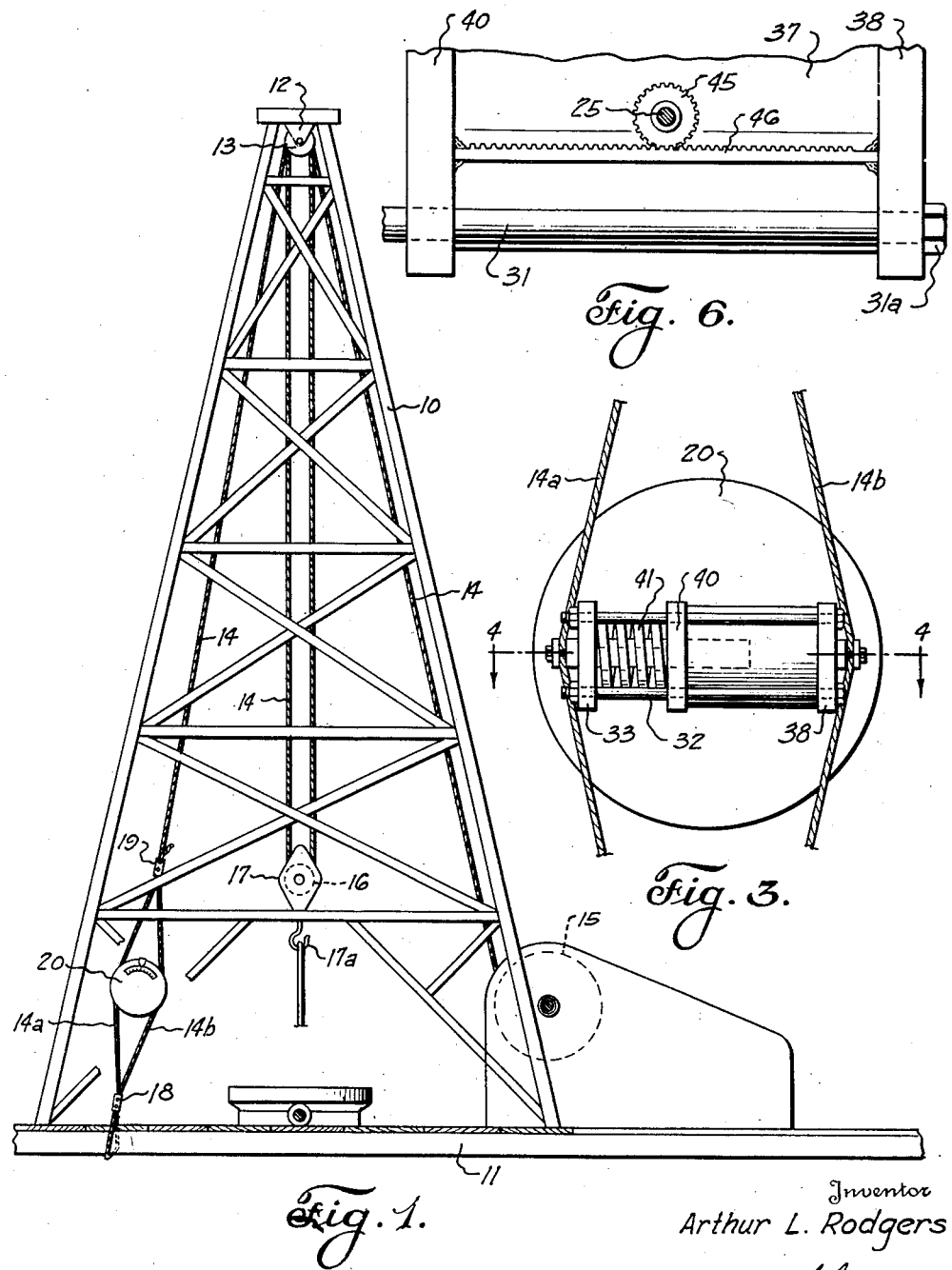
Inventor
Arthur L. Rodgers
By Jack A. Ashley
Attorney July 13, 1943.　　　A. L. RODGERS　　　2,324,174
WEIGHT INDICATOR
Filed May 3, 1940　　　2 Sheets-Sheet 2
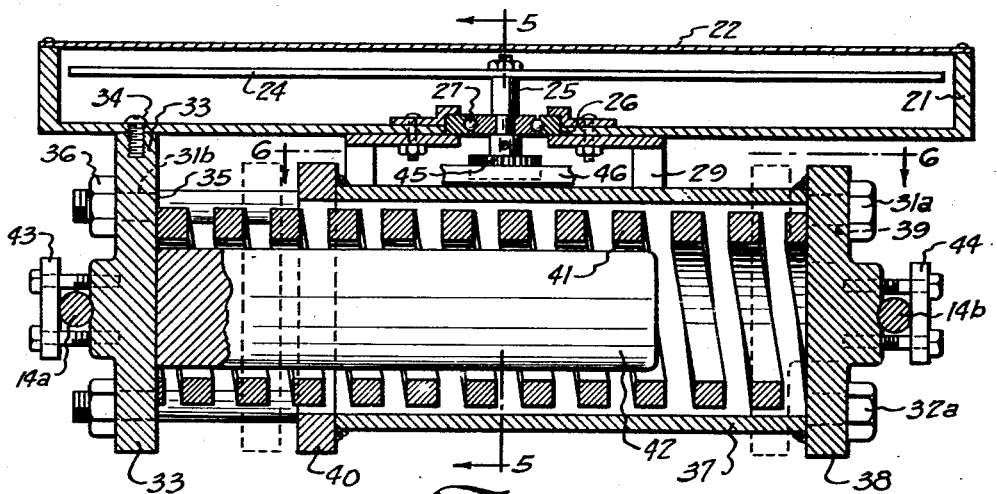

Patented July 13, 1943

2,324,174

UNITED STATES PATENT OFFICE 2,324,174

WEIGHT INDICATOR

Arthur L. Rodgers, Seagraves, Tex., assignor of one-half to Two States Drilling Company, Dallas, Tex., a corporation of Texas Application May 3, 1940, Serial No. 333,079

3 Claims. (Cl. 265—1.6)

This invention relates to new and useful improvements in weight indicators.

One object of the invention is to provide an improved means for measuring and indicating the weight of pipe, tools or other apparatus, which is suspended from a derrick, or other supporting structure, to accurately indicate the load imposed on the supporting structure.

An important object of the invention is to provide an improved indicator or line scale, which is actuated by the single line or cable from which pipe or apparatus is suspended, whereby the tension on the line, which varies in accordance with the weight suspended therefrom, is utilized to operate the device and accurate measurement of the weight on said line is obtained.

A particular object of the invention is to provide a line scale or indicator which is mounted in an improved manner, such mounting including the single supporting line or cable which is arranged to enclose the scale, whereby the tension on said line actuates said scale; the mounting readily lending itself to adjustment in accordance with the particular suspension arrangement of the pipe or other apparatus, whereby said scale will accurately measure and indicate the weight of the suspended apparatus, regardless of the particular manner in which such apparatus is suspended and without changing the dial, or other parts of said scale to compensate for variations in the suspension arrangement.

Another object of the invention is to provide an improved weight indicator which includes a pair of elements which are yieldably held apart and which are adapted to be moved toward each other in accordance with the weight imposed on the supporting line which is associated with the indicator; the movable elements being operatively connected with a visible indicating means whereby said means is actuated in accordance with the movement of said elements to indicate the weight on said line.

Still another object of the invention is to provide an improved device, of the character described, which is simple and sturdy in construction, readily mounted in a position at one side of the derrick floor, and which requires no adjustment to its operating parts after it is once set, the device including a visible indicating means which is disposed in a vertical plane and which is clearly visible at all times.

A construction designed to carry out the invention will be hereinafter described, together with other features of the invention.

The invention will be more readily understood from a reading of the following specification and by reference to the accompanying drawings, in which an example of the invention is shown, and wherein:

Figure 1 is an elevation of a well derrick, illustrating an improved weight indicator, constructed in accordance with the invention mounted in the usual suspension cable or line of said derrick, Figure 2 is a smaller view of the derrick, taken at a right angle to Figure 1, Figure 3 is a rear elevation of the weight indicator or line scale, Figure 4 is an enlarged, longitudinal sectional view, taken on the line 4—4 of Figure 3, Figure 5 is an enlarged, transverse, sectional view, taken on the line 5—5 of Figure 4, and Figure 6 is a longitudinal, sectional view, taken on the line 6—6 of Figure 4.

In the drawings, the numeral 10 designates the well derrick which may be of any desired construction and which is supported on the usual joists or beams 11. A crown block 12 is mounted in the upper end of the derrick 10 in the usual manner and includes a plurality of sheaves or pulleys 13. The usual cable or line 14 from which the pipe, tools, or other apparatus (not shown) is suspended, has one end passed around the draw works drum 15, which is mounted on the derrick floor. The cable 14 passes upwardly over one or more of the sheaves or pulleys 13 of the crown block 12 and is then passed downwardly over one or more pulleys or sheaves 16 of a travelling block 17. After being threaded over the desired number of pulleys 13 and 16 of the crown block 12 and travelling block 17, the line or cable is passed upwardly over one of the pulleys or sheaves 13 of the crown block and then extends downwardly throughout the vertical length of the derrick 10, as is clearly shown in Figure 1. It is the usual practice to fasten this free end of the line or cable to one of the beams or joists 11 in any suitable manner, whereby when a pull is exerted on the line 14, the travelling block 17 is raised within the derrick structure.

In carrying out the present invention, the free end of the line or cable 14 is passed downwardly around one of the beams 11 and is then extended upwardly for quite some distance, as is clearly shown in Figure 1. Adjacent the beam, the overlying or adjacent portions of the cable are clamped together by means of a suitable clamp 18. The extreme outer end of the cable which, after passing beneath the beam extends upwardly contiguous to the downwardly extending portion of the cable, is clamped by means of a clamp 19 to such portion of the cable. With this arrangement, it will be seen that the clamps 18 and 19 are spaced from each other and a pair of lines 14a and 14b are disposed between said clamps. Of course, the lines 14a and 14b are a part of the main cable 14, being formed by the particular manner in which the cable is passed around the beam 11 and clamped by the clamps 18 and 19.

Since the lines 14a and 14b are a part of the single cable, it will be obvious that a pull or tension on the cable will tend to move the lines 14a and 14b inwardly towards each other; similarly, when the tension or pull on the cable 14 is released, the lines 14a and 14b are slackened and tend to move outwardly away from each other. The improved line scale or indicator 20 is adapted to be mounted between the lines 14a and 14b and is arranged to be actuated by the tension or pull on said lines. Thus, when a weight is imposed on the cable 14, the lines 14a and 14b are placed under a tension since they tend to move together or toward each other, and the indicator 20 is operated in accordance with the amount of tension on said lines. The pipe, or other apparatus, (not shown), is secured to a hook 17a which is provided on the lower end of the travelling block 17, whereby such pipe or other apparatus is suspended therefrom. The suspension of the pipe or apparatus from the travelling block 17 imposes the entire weight of the same on the cable 14 and results in placing a predetermined tension upon the lines 14a and 14b, such tension being in accordance with the weight of the apparatus. When a heavier apparatus is suspended from the block 17, a greater tension is imposed on the lines 14a and 14b to actuate the indicator 20 accordingly; when a lesser weight is suspended from the block 17, the tension on the lines 14a and 14b is less and the indication of the scale or indicator is in accordance with this lesser tension. Therefore, the indicator provides a positive means for measuring and indicating the weight which is suspended from the cable 14 and therefore, provides accurate information as to the amount of weight imposed upon the derrick structure 10.

In actual practice, the cable 14 is sometimes passed over only one or two of the pulleys or sheaves 13 of the crown block 12 and one or two of the pulleys 16 of the travelling block 17. In other instances, the cable may be passed over three or four of the pulleys of each of the blocks 12 and 17 and obviously, the particular manner in which the cable is threaded through the blocks changes the tension which will be imposed upon the cable 14 when a particular weight is suspended from the block 17. In other words, if only two pulleys of each block are employed for receiving the cable 14, a weight will impose a predetermined tension on the cable. However, if the cable is threaded over three or more of the pulleys and the same weight is suspended from the block 17, then a different tension will be imposed upon the cable 14. In order to take care of the different suspension arrangements which are commonly employed, it has heretofore been the practice to change the indicating dial or the indicating mechanism for each arrangement. However, with the apparatus described herein, the same indicator 20 is employed regardless of the suspension arrangement of the cable over the crown block 12 and the travelling block 17. When a different suspension arrangement is employed, it is only necessary to loosen the clamps 18 and 19 and change the distance between said clamps. Such change in the distance between the clamps 18 and 19 will result in a change in the length of the lines 14a and 14b. This change in the length of the lines will vary the leverage and will change the tension imposed upon said lines when a predetermined weight is placed on the cable 14. By properly adjusting the clamps 18 and 19, the indicator 20 will properly and accurately measure and indicate the weight suspended from the cable 14 regardless of the particular suspension arrangement of the cable with respect to the crown block 12 and the travelling block 17.

The indicator 20 is clearly shown in Figures 3 to 6 and includes a circular casing 21 which is provided with a cover 22. This cover is formed with an arcuate window 23 through which a rotatable indicating element 24, which is shown as a disk, is visible. The disk is mounted on a rotatable shaft 25 which extends downwardly through a central or axial opening 26 provided in the rear wall or bottom of the casing. Suitable bearings 27 are confined within the opening 26 and surround the shaft 25 so as to make the same freely rotatable. A fixed pointer 28 is secured to the peripheral portion of the casing 21 and is disposed centrally of the arcuate opening 23, said pointer coacting with the indications on the disk 24 to accurately indicate the position of the disk within the casing.

A plurality of depending brackets 29 are secured to the underside of the casing 21 and the lower portion of each bracket is formed with an opening 30 therein. The brackets are arranged in pairs with each pair being disposed on one side of the central opening 26 within the casing. A guide rod 31 extends longitudinally beneath the casing 21 and passes through each pair of brackets 29, as is clearly shown in Figure 5. The two guide rods 31 are substantially parallel to each other and each rod 31 has one end extending through an opening 31b which is provided in a substantially square headplate 33. The headplate is fastened to the casing by means of a screw 34, as is clearly shown in Figure 4, and it is preferable that the end of each rod 31 be confined against movement within the opening 31b of said plate. For this purpose, the rod may be shouldered at 35 and may receive a nut 36 on its outer threaded end. In addition to the guide rods 31 another pair of guide rods 32 are located at the lower portion of the plate 33 and the rods 32 extend in parallel relation to the rods 31, being disposed therebelow (Fig. 5).

A movable cylinder 37 is disposed between the guide rods 31 and 32 and has one end closed by a substantially square headplate 38, which is welded, or otherwise secured thereto. As is clearly shown in Figure 5, the plate is of a larger size than the cylinder 37, whereby the guide rods 31 and 32 may extend through openings 39 which are provided in the corners of said plate. The rods 31 are formed with bolt heads 31a, while the rods 32 are provided with similar bolt heads 32a so as to limit the movement of the cylinder and headplate on the rods in a direction to the right in Figure 4. The opposite end of the cylinder 37 is open and has a flange element 40 welded, or otherwise secured thereto. The element 40 forms a square flange which surrounds the open end of the cylinder and this flange has the guide rods 31 and 32 extending therethrough. With the above arrangement, it will be manifest that the cylinder 37 is freely slidable toward and away from the fixed plate 33, said cylinder being guided in its movement by the guide rods 31 and 32.

For urging the cylinder 37 away from the plate 33, a spring 41 is disposed within the cylinder 37 and has one end engaging the headplate 38 thereof, the opposite end of said spring bearing against the stationary plate 33. A guide stem 42 is suitably secured to the inner surface of the plate 33 and extends inwardly within the cylinder 37, said stem being surrounded by the spring 41. Manifestly, the spring 41 exerts its force to constantly urge the cylinder 37 away from the headplate and into contact with the bolt heads 31a and 32a, as is clearly shown in Figure 4.

As explained, the device is adapted to be mounted between the lines 14a and 14b so that said device is actuated by the tension imposed on these lines. The line 14a passes over the stationary plate 33 and is clamped thereto by means of a suitable clamping plate 43, which is bolted to the outside of the plate 33. The other line 14b overlies the headplate 38 of the cylinder 37, being clamped thereto in a similar manner by means of a clamping element 44 which is bolted to said headplate. In this manner, it will be manifest that the coil spring 41 which is constantly urging the cylinder 37 away from the stationary plate 33, also exerts its force to keep the lines 14a and 14b away from each other in a spread position. When a tension is imposed on the lines 14a and 14b, due to the imposition of a weight on the cable 14, said lines are moved inwardly toward each other against the tension of the spring 41 whereby the cylinder 37 is slid or moved toward the plate 33, such movement being guided by the rods 31 and 32. Of course, the amount of movement which is imparted to the cylinder is controlled by and is in accordance with, the weight which is suspended from the cable 14. Therefore, it will be seen that the cylinder 37 is moved a predetermined distance in accordance with the weight which is suspended from the travelling block 17 which is supported by the cable 14.

For transmitting the movement from the cylinder 37 to the indicating disk 24 within the casing 21 so that said disk will indicate the amount of weight suspended from the cable 14, the shaft 25 of said indicator disk projects below the opening in the casing 21. This projecting end of the shaft 25 is provided with a pinion 45, which is secured to the shaft so as to be rotatable therewith. For imparting a rotation to the pinion 45 and thus rotate the disk 24 in accordance with the movement of the piston, a gear rack 46 is mounted on the cylinder and has its teeth in constant engagement with said pinion. With this arrangement, it will be manifest that when the cylinder 37 is moved by the inward movement of the lines, the gear rack is moved therewith and since the pinion is stationary, a rotation is imparted to the pinion to rotate the indicating disk 24. The rotation of the pinion will, of course, be in accordance with the amount of movement of the cylinder 37, and therefore the indicator disk 24 will be rotated in accordance with the movement of said cylinder, as controlled by the tension imposed on the lines 14a and 14b.

In the operation of the device, the indicator 20 is mounted between the lines 14a and 14b, which lines are a part of the cable 14, being formed by passing the cable beneath the beams 11 in the manner shown and by providing the clamps 18 and 19. Of course, the clamps 18 and 19 are located in such manner and the indicating disk 24, together with its associate parts is constructed so that a predetermined tension on the lines 14a and 14b will cause the indicator disk 24 to display the desired reading. The weight of the pipe, or other apparatus (not shown) which is suspended from the travelling block 17, is imposed upon the cable 14 and this places the lines 14a and 14b under a predetermined tension, in accordance with such weight. The amount of tension on the lines 14a and 14b causes a movement of the spring-pressed cylinder 37 inwardly toward the stationary headplate 33, such movement being controlled by the tension of said lines. As the cylinder 37 moves inwardly toward the plate 33, a rotation is imparted to the indicator shaft 25 through the medium of the gear rack 46 and pinion 45. The indicator disk 24 is thus rotated in direct proportion to, and in accordance with, the movement of the cylinder 37 to provide an indication of the amount of weight which is suspended from the crown block. By accurately determining the weight which is suspended from the cable 14, the weight which is imposed on the derrick structure 10 is thus ascertained.

It is pointed out that the device is relatively simple in construction and once adjusted, requires no further adjustment. The force of the spring 41 may be varied to permit the desired movement of the cylinder under predetermined conditions. When the suspension arrangement of the pipe, or other apparatus from the travelling block 17 is changed, that is, when the threading of the cable 14 over the pulleys 13 and 16 is changed, then it is only necessary to change the position of the clamps 18 and 19 with respect to each other so as to compensate for the difference in the tension on the cable 14, which difference is caused by a change in the suspension arrangement. This makes it unnecessary to change the indicating disk or to otherwise adjust the device for different suspension arrangements. It is pointed out that although a gear rack and pinion has been shown as connecting the cylinder and indicating disk, the invention is not to be limited to such connection as any other suitable means for operatively connecting these parts may be employed as, for example, a cable and pulley arrangement. Also, the indicating element 24 could be in the form of a pointer or needle instead of a circular disk as shown.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A device, of the character described including, a casing, a rotatable shaft mounted in the casing and having an indicating element mounted thereon, a fixed plate secured to the exterior of the casing, guide rods carried by the plate and casing, a cylinder slidable on said guide rods and movable toward and away from the fixed plate, resilient means for resisting the movement of the cylinder, whereby a predetermined pressure must be applied to the end of the cylinder to effect a predetermined movement of the same, and means for rotating the indicating element in accordance with the movement of the cylinder.

2. A device, of the character described including, a casing, a rotatable shaft mounted in the casing and having an indicating element mounted thereon, a fixed plate secured to the exterior of the casing, guide rods carried by the plate and casing, a cylinder slidable on said guide rods and movable toward and away from the fixed plate, resilient means for resisting the movement of the cylinder, whereby a predetermined pressure must be applied to the end of the cylinder to effect a predetermined movement of the same, and a direct connection between the movable cylinder and the rotatable shaft on which the indicating element is mounted, whereby the indicating element is rotated in accordance with the movement of the cylinder.

3. A device, of the character described, including, a casing, a rotatable shaft mounted in the casing and having an indicating element mounted thereon, a fixed plate secured to the exterior of the casing, guide rods carried by the plate and casing, a cylinder slidable on said guide rods and movable toward and away from the fixed plate, resilient means for resisting the movement of the cylinder, whereby a predetermined pressure must be applied to the end of the cylinder to effect a predetermined movement of the same, a gear rack attached to the exterior of the cylinder so as to be movable with said cylinder, and a pinion mounted on the rotatable shaft and in constant mesh with said rack, whereby movement of the cylinder imparts rotation to the indicating element in accordance with the movement of said cylinder.

ARTHUR L. RODGERS.